Figure 1:
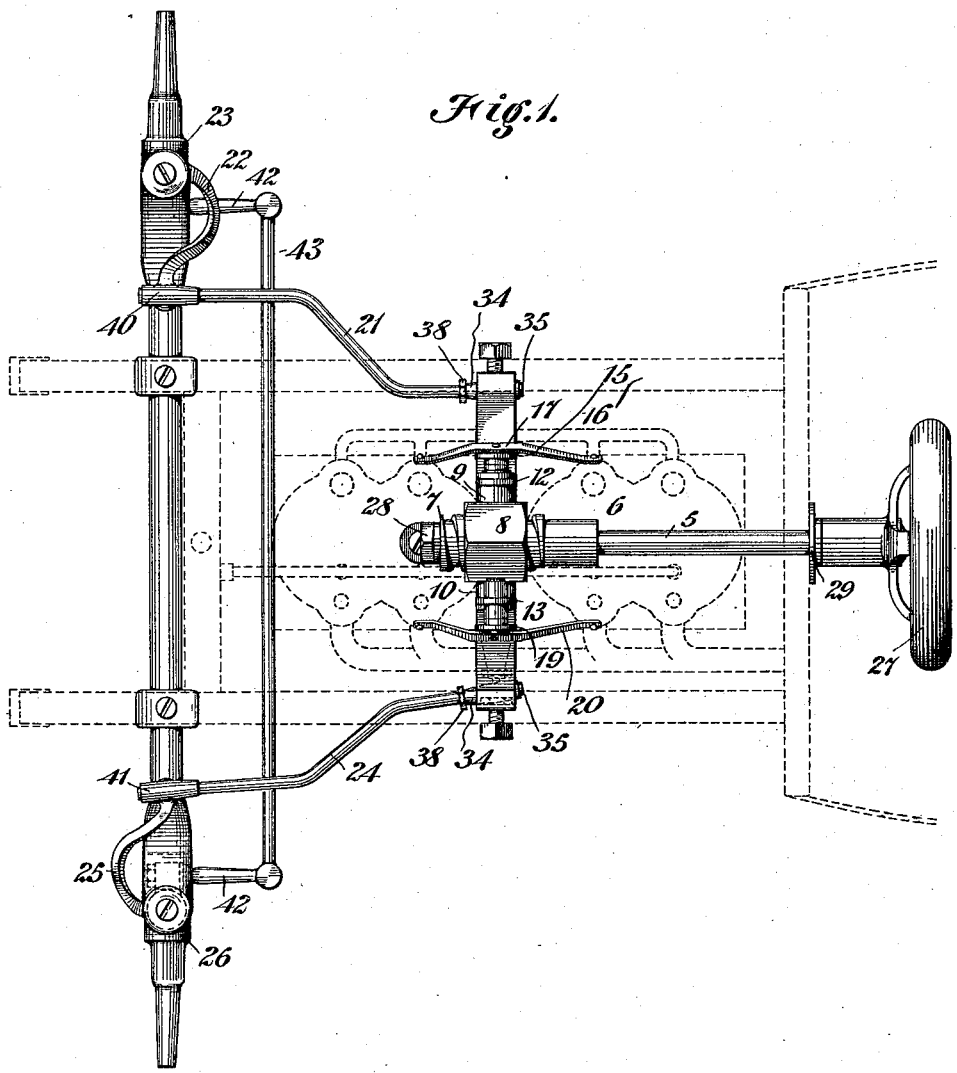

J. H. AYRE.
STEERING MECHANISM FOR VEHICLES.
APPLICATION FILED APR. 22, 1914.

1,142,658.

Patented June 8, 1915.
2 SHEETS—SHEET 1.

WITNESSES

INVENTOR
John H. Ayre
BY
ATTORNEYS

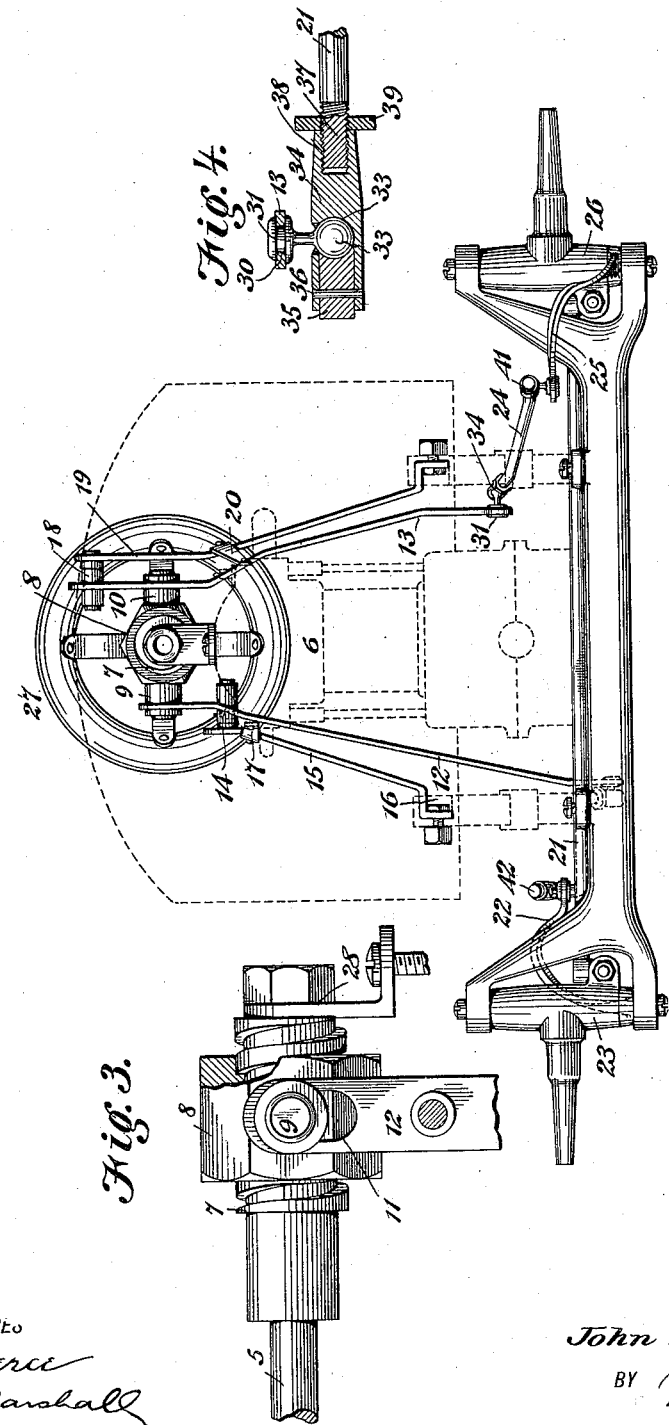
J. H. AYRE.
STEERING MECHANISM FOR VEHICLES.
APPLICATION FILED APR. 22, 1914.
1,142,658.
Patented June 8, 1915.
2 SHEETS—SHEET 2.
INVENTOR
John H. Ayre

UNITED STATES PATENT OFFICE.

JOHN HOUSTON AYRE, OF TILTON, NEW HAMPSHIRE.

STEERING MECHANISM FOR VEHICLES.

1,142,658.  Specification of Letters Patent.  Patented June 8, 1915.

Application filed April 22, 1914. Serial No. 833,666.

*To all whom it may concern:*

Be it known that I, JOHN H. AYRE, a subject of the King of Great Britain, and a resident of Tilton, in the county of Belknap and State of New Hampshire, have invented a new and Improved Steering Mechanism for Vehicles, of which the following is a full, clear, and exact description.

My invention has for its object to provide a steering mechanism for vehicles having a threaded rod which is operated by a steering wheel and which meshes in a nut articulated to levers connected with the usual automobile axles, pivoted on vertical axes. There are two levers, one of the levers being of the first class and the other lever being of the third class so that with the rotation of the rod in one direction, one of the axles will be moved rearwardly as the other axle is moved forwardly.

Additional objects of the invention will appear in the following specification in which the preferred form of my invention is disclosed.

In the drawings similar reference characters refer to similar parts in all the views in which—

Figure 1 is a plan view showing my invention; Fig. 2 is a front view of Fig. 1; Fig. 3 is a fragmentary sectional view showing the connection of one of the levers with the nut which meshes with the thread on the rod; and Fig. 4 is a fragmentary sectional view showing the means for connecting the levers and the arms on the axles with the links which connect the said levers with the said arms.

By referring to the drawings it will be seen that a rod 5 is disposed longitudinally of an automobile and over the automobile engine 6, the said rod 5 having a thread 7 with which meshes the nut 8, this nut 8 having studs 9 and 10 which are disposed in the slots 11 in the levers 12 and 13. The lever 12 is fulcrumed to a stud 14, this stud 14 extending inward from a standard 15 which is supported by the automobile frame 16. Arms 17 which are secured to the standard 15 are connected with the automobile engine 6 for stiffening purposes. The lever 13 is fulcrumed to the stud 18 which extends inwardly from the standard 19, this standard 19 being secured to the automobile frame and having arms 20 which are secured to the automobile engine for stiffening purposes. The lower end of the lever 12 is articulated to the rear terminal of a link 21, the forward terminal of this link 21 being articulated to the curved arm 22 which is secured for rotating with the axle 23. The lower end of the lever 13 is articulated to the rear of the link 24, the forward end of this link 24 being articulated to the curved arm 25 which is secured for rotating with the short axle 26. It will be seen that the lever 12 is of the first class, while the lever 13 is of the third class, and that with the rotation of the rod 5 in one direction, one of the axles will be moved rearwardly while the other short axle is moved forwardly.

A steering wheel 27 is secured to the rear of the rod 5, this rod 5 being journaled in bearings 28 and 29. The lower ends of the levers 12 and 13 having bearings 30 in which are journaled the studs 31, these studs 31 having bearing knobs 32 which are disposed in openings 33 in bearing members 34, the bearing knobs 32 being held in the openings by the plugs 35 which are in turn held in place by the pins 36. The links 21 and 24 have threaded rear terminals 37 which mesh in threaded openings 38 in the bearing members 34, nuts 39 also meshing with the threaded ends 37 of the links 21 and 24, and engaging the bearing members 34 for locking the links to the said bearing members. The curved arm 22 which connects the forward end of the link 21 with the axle 23 is bent around the rear of the axle while the curved arm 25 which connects the forward end of the link 24 with the axle 26 is bent around the front of the said axle. The forward ends of the links 21 and 24 are threaded and mesh in threaded openings in the bearing members 40 and 41, these bearing members 40 and 41 having openings in which are disposed bearing knobs similar to the bearing knobs 32 shown in Fig. 4 of the drawings, these bearing knobs being held in place by the same means as the bearing knobs 23 as shown in the said figure of the drawings, and having studs similar to the studs 31, these studs being journaled in bearings in the arms 22 and 25. The axles 23 and 26 have the usual rearwardly extending arms 42, a connecting rod 43 being articulated to the said arms 42.

Having thus described my invention I claim as new and desire to secure by Letters Patent:

1. In combination with an automobile having a frame, an engine and axles pivoted on vertical axes, a threaded rod disposed over the engine, bearings in which the rod is journaled, a lever disposed at each side of the engine, a nut meshing with the thread on the rod, and articulated to the levers, two standards secured to the frame and one extending upwardly adjacent each of the levers one of the levers being pivoted to the adjacent standard above the horizontal plane of the nut and the other lever being pivoted to the other standard below the horizontal plane of the nut, an arm on each axle and links connecting the lower ends of the levers with the arms.

2. In combination with an automobile having a frame and axles pivoted on vertical axes, a threaded rod disposed over the engine, bearings in which the rod is journaled, a lever disposed at each side of the engine, a nut meshing with the thread on the rod, means connecting the nut with the levers for operating the latter, one of the levers being fulcrumed above and the other lever being fulcrumed below the horizontal plane of the nut, and means connecting the levers with the axles for operating the latter.

3. In combination with an automobile having an engine and an axle pivoted on a vertical axis, a threaded rod disposed over the engine, bearings in which the rod is journaled, a lever disposed at one side of the engine, a nut meshing with the thread on the rod, means connecting the nut with the lever for operating the latter, and means connecting the lever with the axle for operating the latter.

In testimony whereof I have signed my name to this specification in the presence of two subscribing witnesses.

JOHN HOUSTON AYRE.

Witnesses:
 EDWARD R. JACKSON,
 GEORGE T. LORD.

Copies of this patent may be obtained for five cents each, by addressing the "Commissioner of Patents, Washington, D. C."